(12) United States Patent
Hughes

(10) Patent No.: US 7,091,442 B2
(45) Date of Patent: Aug. 15, 2006

(54) WELDING APPARATUS AND METHOD FOR WELDING OVERLAPPING COATED SHEETS

(75) Inventor: Russell Vernon Hughes, Plymouth, MI (US)

(73) Assignee: International Aluminium Holdings Limited, Coventry (GB)

( * ) Notice: Subject to any disclaimer, the term of this patent is extended or adjusted under 35 U.S.C. 154(b) by 31 days.

(21) Appl. No.: 10/909,163

(22) Filed: Jul. 30, 2004

(65) Prior Publication Data

US 2005/0006354 A1    Jan. 13, 2005

Related U.S. Application Data

(63) Continuation-in-part of application No. 10/801,484, filed on Mar. 16, 2004, which is a continuation of application No. 10/194,743, filed on Jul. 12, 2002, now Pat. No. 6,706,992, which is a continuation-in-part of application No. 10/048,206, filed as application No. PCT/GB00/02920 on Jul. 28, 2000, now Pat. No. 6,841,753.

(51) Int. Cl.
*B23K 10/00* (2006.01)
(52) U.S. Cl. .......................... 219/121.45; 219/121.46; 219/137 R

(58) Field of Classification Search ........... 219/121.45, 219/121.46, 121.59, 121.36, 121.48, 121.51, 219/74, 75
See application file for complete search history.

(56) References Cited

U.S. PATENT DOCUMENTS

| 4,159,410 A | * | 6/1979 | Cooper ..................... 219/137.7 |
| 4,916,284 A | * | 4/1990 | Petrick ................... 219/121.64 |
| 5,451,742 A | * | 9/1995 | Nishio et al. .......... 219/121.64 |
| 6,255,618 B1 | * | 7/2001 | Shintani et al. ........ 219/121.46 |

* cited by examiner

*Primary Examiner*—Mark Paschall
(74) *Attorney, Agent, or Firm*—Carlson, Gaskey & Olds

(57) ABSTRACT

A welding apparatus spot welds an upper sheet and a lower sheet together. A substantially semi-circular hole or notch is formed at an edge of the upper sheet at the desired location of spot welding. When the semi-circular hole or notch is formed, the process does not wrinkle or deform the upper sheet. A clamping cup of the welding apparatus surrounds the semi-circular hole or notch and contacts the upper surface of the upper sheet. A plasma arc torch heats the sheets, allowing entrapped vapors in a coating on the lower sheet to vent freely to the atmosphere. Filler wire is added and melted to fill the semi-circular hole or notch and to secure the overlapping sheets together.

27 Claims, 4 Drawing Sheets

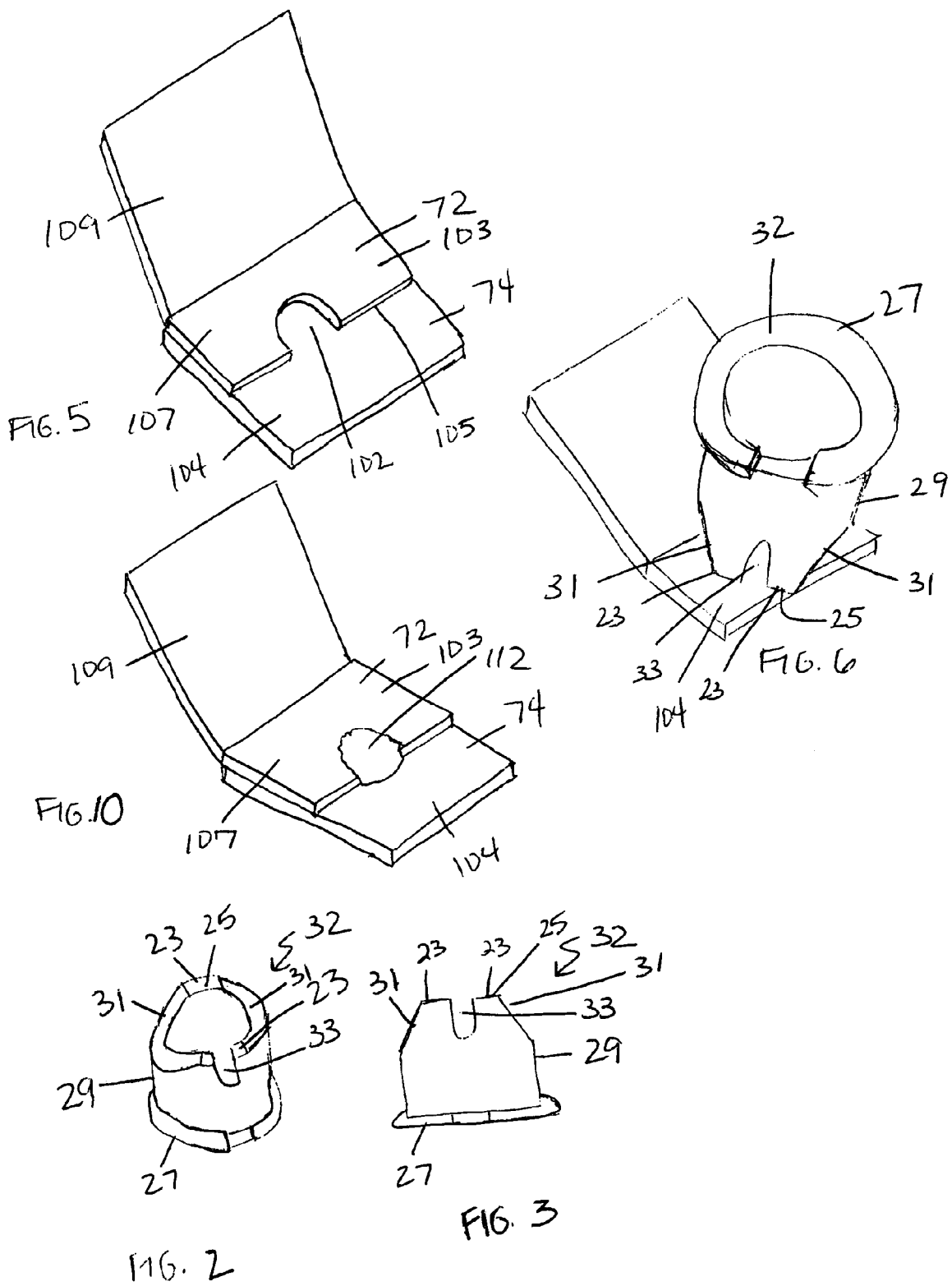

WELDING APPARATUS AND METHOD FOR WELDING OVERLAPPING COATED SHEETS

REFERENCE TO RELATED APPLICATION

This application is a continuation in part of U.S. patent application Ser. No. 10/801,484 filed Mar. 16, 2004, which is a continuation of U.S. patent application Ser. No. 10/194,743 filed Jul. 12, 2002 now U.S. Pat. No. 6,706,992, which is a continuation in part of U.S. patent application Ser. No. 10/048,206 filed on May 7, 2002 now U.S. Pat. No. 6,841,753, which is the National Stage Application of PCT application PCT/GB00/02920 filed on Jul. 28, 2000, which claims priority to Great Britain patent applications GB9918476.4 filed on Aug. 6, 1999 and GB9924304.0 filed on Oct. 15, 1999.

BACKGROUND OF THE INVENTION

The present invention relates generally to an apparatus and method for spot welding an upper coated sheet including a semi-circular hole or notch formed at an edge to a lower coated sheet at the location of the semi-circular hole or notch.

Spot welding type process have been employed to secure overlapping sheets of material together. In one variant, a circular hole is punched in an upper sheet at the desired location of the weld, and the upper sheet is positioned over a lower sheet. The two sheets are then spot welded together at the location of the circular hole. The sheets are commonly made of zinc coated sheet steel or aluminum or magnesium alloys with tenacious surface oxide films.

The circular hole is generally punched away from the edge of the upper sheet because it is difficult to punch circular holes near the edge without deforming or wrinkling the upper sheet. Additionally, as the circular hole is punched closer to the edge of the upper sheet, the material between an edge of the circular hole and the edge of the upper sheet is more likely to melt during welding. This can create a very brittle joint that has variable strength properties and a poor cosmetic appearance.

The distance between an edge of the circular hole and the edge of the upper sheet should ideally be at least equal to the diameter of the circular hole. If the sheets are made of aluminum, magnesium or other materials having a high thermal conductivity, the distance between the edge of the semi-circular hole or notch and the edge of the upper sheet should ideally be at least 1.5 times the diameter of the semi-circular hole or notch to prevent over-melting of the upper sheet. However, if the upper sheet is a narrow flange, it may not be possible to locate the circular hole away from the edge of the upper sheet sufficiently far to create optimal conditions.

Hence, there is a need in the art for an apparatus and method for spot welding an upper sheet to a lower sheet that prevents deformation and wrinkling of the upper sheet, that produces a spot weld having a good cosmetic appearance, and overcomes other problems of the prior art.

SUMMARY OF THE INVENTION

A welding apparatus spot welds a coated upper sheet and a coated lower sheet together. The upper sheet may include a flange portion and an angled portion. The upper and lower sheets can be zinc coated steel or aluminum or magnesium alloys with oxide coatings. A semi-circular hole or notch is formed at an edge of the flange portion of the upper sheet at the desired location of welding.

The upper and lower sheets are positioned such that the semi-circular hole or notch is aligned with a plasma arc torch of the welding apparatus. A clamp cup of the welding apparatus contacts an upper surface of the flange portion of the upper sheet. The clamp cup includes angled sides to prevent interaction between the clamp cup and the angled portion of the upper sheet. A plasma arc of the plasma arc torch passes through the semi-circular hole or notch and contacts a portion of the upper surface of the lower sheet that is located within the semi-circular hole or notch. The plasma arc torch heats the upper surface of the lower sheet, freely venting entrapped vapors and lubricants.

Filler wire melted by the plasma arc torch fills the semi-circular hole or notch and secures the upper and lower sheets together. If the upper and lower sheets are zinc coated steel, the filler wire is typically copper based and may include alloys of silicon bronze, aluminum bronze, and cupro-nickel. If the upper and lower sheets are aluminum or magnesium alloys with oxide coatings, the filler wire is typically an alloy of aluminum or magnesium, respectively.

These and other features of the present invention will be best understood from the following specification and drawings.

BRIEF DESCRIPTION OF THE DRAWINGS

An embodiment of the present invention will now be described with reference to the accompanying drawings in which:

FIG. 2 illustrates a perspective view of a clamp cup;

FIG. 3 illustrates a side view of the clamp cup;

FIG. 5 illustrates a perspective view of the upper sheet and the lower sheet;

FIG. 6 illustrates a perspective view of the clamp cup placed on the upper sheet;

FIG. 10 illustrates a perspective view of the upper sheet and the lower sheet after the spot welding is complete;

DETAILED DESCRIPTION OF THE PREFERRED EMBODIMENT

Figure 1:
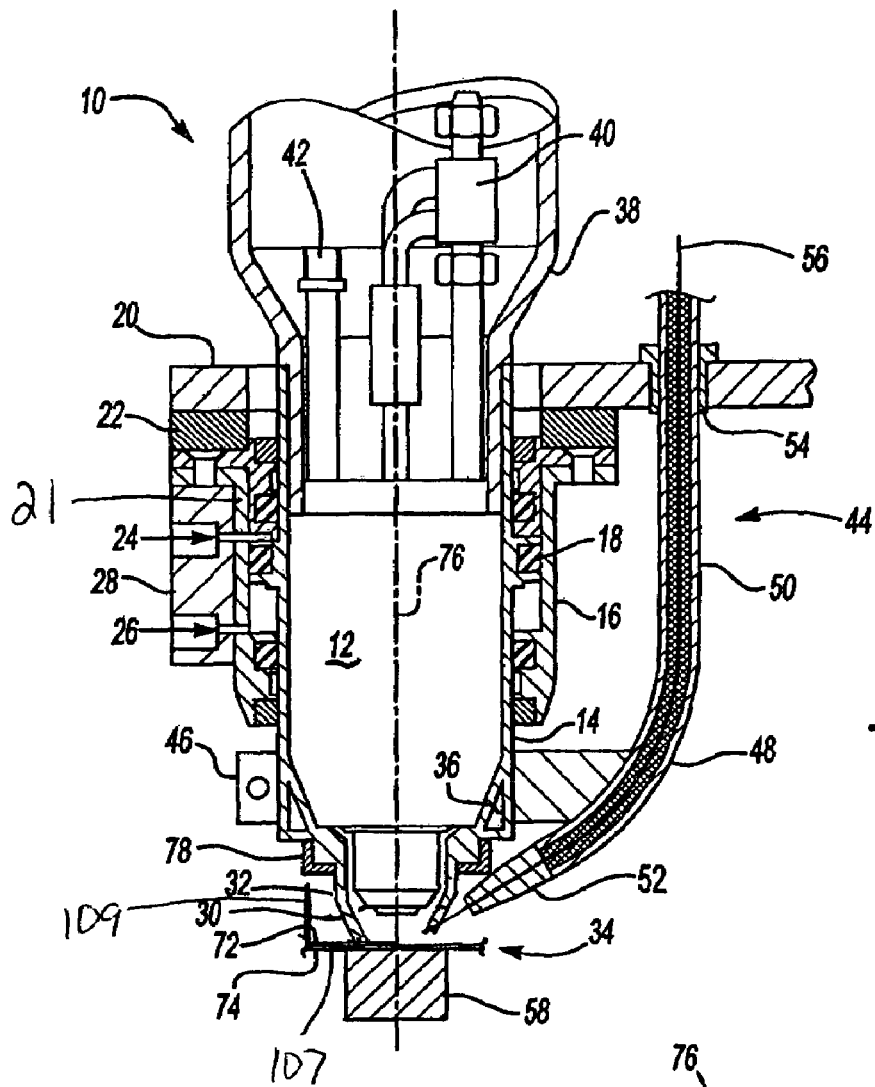
FIG. 1 illustrates a cross-sectional side view of the welding apparatus of the present invention.

FIG. 1 illustrates a welding apparatus 10 of the present invention. The welding apparatus 10 includes a plasma arc welding torch 12 mounted on a movable carriage 14. The movable carriage 14 is movable within a cylinder 16, and an outer portion of the movable carriage 14 carries a peripheral seal 18 that allows the movable carriage 14 to act as a piston. The cylinder 16 is connected to a mounting bracket 20 by a vibration absorbent compliance ring 22. The movable carriage 14 is movable relative to the cylinder 16 by the selective application of fluidic pressure (such as pneumatic pressure) to the cylinder 16 through apertures 24 and 26 provided in a wall 21. The apertures 24 and 26 are provided both above and below the peripheral seal 18. A source of fluidic pressure is connected to a porting block 28 adjacent to the apertures 24 and 26.

The plasma arc welding torch 12 includes a constricting orifice 30 that projects from the moveable carriage 14 and is shrouded by a clamp cup 32 carried by the movable carriage 14. The clamp cup 32 is connected to the moveable carriage 14 by a retaining ring 78. The clamp cup 32 clamps the workpiece 34 and ensures adequate gas shielding at the weld location.

FIGS. 2 and 3 illustrate the clamp cup 32 of the present invention. The clamp cup 32 includes two clamp feet 23 on a first surface 25 that contact the workpiece 34, an opposing second surface 27 connected the moveable carriage 14, and a cylindrical side surface 29 between the first surface 25 and the opposing second surface 27. Two angled portions 31 extend between the first surface 25 and the cylindrical side surface 29. Preferably, the two angled portions 31 are on opposing sides of the clamp cup 32. The clamp cup 32 also includes an aperture 49 between the clamp feet 23 through which a filler wire 56 is fed. Although only two clamp feet 23 are illustrated and described, it is to be understood that any number of clamp feet 23 can be employed. Additionally, the clamp feet 23 can be symmetrically or asymmetrically arranged around the clamp cup 32. The two angled portions 31 allow the clamp cup 32 to gain better access on the flange portion 107 and allow uniform and direct clamping of the workpiece 34.

The movable carriage 14 includes cooling channels 36. Coolant circulates through the cooling channels 36 to cool the welding apparatus 10 during operation. The plasma arc welding torch 12 is retained in the movable carriage 14 by a tubular retaining sheath 38. The tubular retaining sheath 38 also houses the gas and power connections 40 and 42 of the plasma arc welding torch 12.

A filler wire guide 44 guides the filler wire 56 and includes a curved guide tube 48 that passes through the mounting bracket 20, a liner 50 and a tapered tip 52. The curved guide tube 48 is connected to the movable carriage 14 by the support clamp 46, and an insulated guide bush 54 in the mounting bracket 20 allows relative movement of the curved guide tube 48.

A feed mechanism moves the filler wire 56 through the filler wire guide 44. Typically, the filler wire 56 is stored on a drum in the feed mechanism. The tapered tip 52 of filler wire guide 44 is positioned such that the filler wire 56 can be fed through the aperture 49 in the clamp cup 32. The feed mechanism moves the filler wire 56 at a predetermined feed rate relative to a weld pool 110 (shown in FIG. 8). Typically, the filler wire 56 is fed into the weld pool 110 at 4 meters per minute and is withdrawn from the weld pool 110 at 5 meters per minute. One skilled in the art would know what speeds to move the filler wire 56. Preferably, the feed mechanism also includes a guide mechanism that guides the filler wire 56 to a predetermined location in the weld pool 110. Preferably, the filler wire 56 moves at a relatively shallow angle with respect to the workpiece 34. Preferably, the angle between the filler wire 56 and the workpiece 34 is between 20° and 45°.

Figure 4:
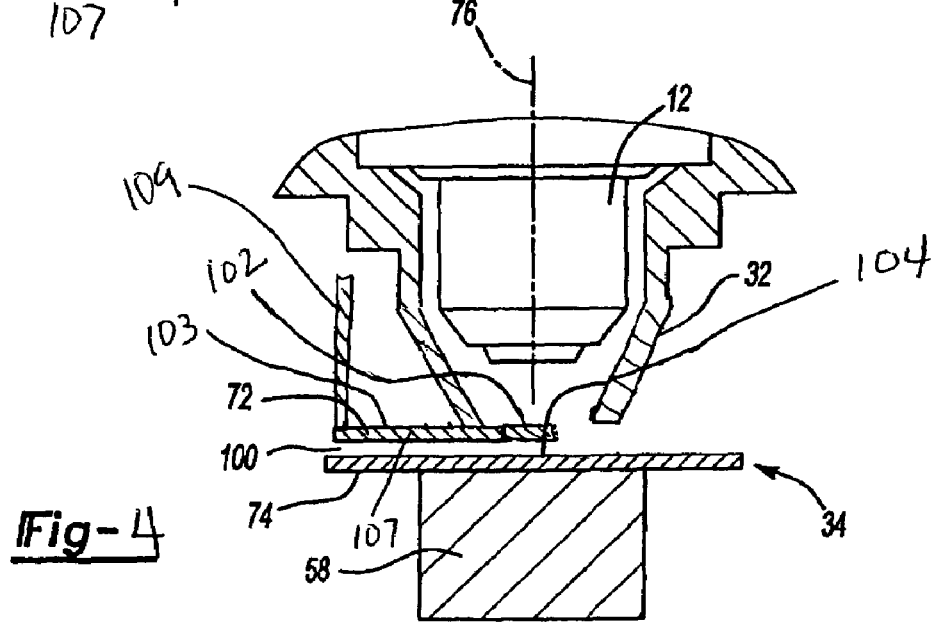
FIG. 4 illustrates a side view of the welding apparatus prior to welding.

As shown in FIG. 4, the workpiece 34 includes an upper sheet 72 and a lower sheet 74 which overlap. The sheets 72 and 74 are positioned on a support surface 58. A small gap 100 exits between the sheets 72 and 74 and is shown enlarged for illustrative purposes only. Although only two sheets 72 and 74 are illustrated and described, it is to be understood that any numbers of sheets 72 and 74 can be employed. Preferably, the sheets 72 and 74 are zinc coated steel. However, it is to be understood that other coated materials can be employed. For example, the sheets 72 and 74 can be made of aluminum or magnesium alloys with oxide coatings.

As shown in FIG. 5, a hole or notch 102 is formed at an edge 105 of the upper sheet 72 at the desired location of the spot weld. Preferably, the hole or notch 102 is substantially semi-circular in shape. However, it is to be understood that the hole or notch 102 can have other shapes. The upper sheet 72 can also include more than one hole or notch 102. When the upper sheet 72 is positioned over the lower sheet 74, a portion of the upper surface 104 of the lower sheet 74 within the hole or notch 102 is exposed. The upper sheet 72 may include a flange portion 107 and an angled portion 109 angled with respect to the flange portion 107. The hole or notch 102 is formed in the flange potion 107 by punching, shearing or by other suitable methods. The hole or notch 102 can also be punched by a correspondingly shaped punch incorporated as a part of a tool used to trim the workpiece 34. One skilled in the art would know how to form the hole or notch 102. When the hole or notch 102 is formed at the edge 105 of the upper sheet 72, the process does not tear, wrinkle or distort the flange portion 107 of the upper sheet 72. Because the hole or notch 102 is formed at the edge 105 of the upper sheet 72, the width of the flange portion 107 can be reduced compared to the upper sheets used in the prior art. By reducing the width of the flange portion 107, the weight of the finished product can be reduced. For example, an automotive body shell may incorporate tens or even hundreds of feet of weld flanges that are used to weld the structure together. By narrowing the flanges, the vehicle bodyshell weight can be reduced.

The workpiece 34 is positioned such that the hole or notch 102 aligns with a nominal axis 76 of the plasma arc welding torch 12. As shown in FIG. 6, the moveable carriage 14 is lowered until the clamp cup 32 of the plasma arc welding torch 12 surrounds the hole or notch 102. The clamp cup 32 contacts the upper surface 103 of the upper sheet 72 and clamps the workpiece 34 against the support surface 58, preventing the sheets 72 and 74 from moving relative to one another. Because of the two angled portions 31, the clamp cup 32 does not contact or interact with the angled portion 109 of the upper sheet 72. Therefore, the clamp cup 32 can gain access to the flange portion 107 and uniformly and directly clamp the sheets 72 and 74 together.

Figure 7:
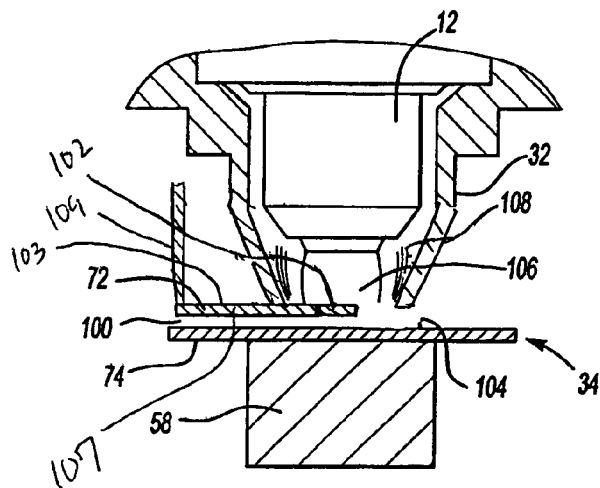
FIG. 7 illustrates a side view of the welding apparatus when the welding arc enters the semi-circular hole or notch and contacts the lower sheet.

As shown in FIG. 7, the plasma arc welding torch 12 creates a high temperature welding arc 106 that contacts the upper surface 104 of the lower sheet 74. Entrapped gases or volatile lubricants 108 on the upper surface 104 of the lower sheet 74 freely vent to the atmosphere that surrounds the zone of the high temperature welding arc 106. If the sheets 72 and 74 are zinc coated steel, the heat from the high temperature welding arc 106 releases zinc vapors from the upper surface 104 of the lower sheet 74 in the vicinity of the hole or notch 102.

Figure 8:
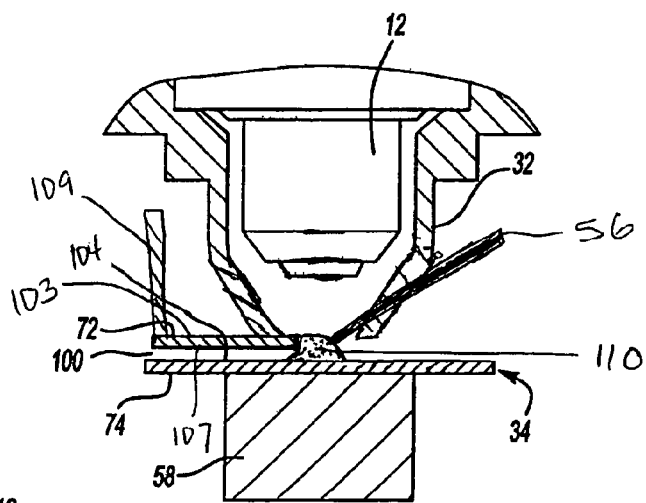
FIG. 8 illustrates a side view of the welding apparatus during the addition of filler wire.

As shown in FIG. 8, the filler wire 56 is inserted into the aperture 49 in the clamp cup 32 and melted to fill the hole or notch 102 and secure the sheets 72 and 74 together. As the filler wire 56 is advanced, the filler wire 56 melts and creates a weld pool 110. Preferably, the composition of the filler wire 56 is dissimilar to the composition of the sheets 72 and 74. If the sheets 72 and 74 are zinc coated steel, the filler wire 56 is preferably copper based and may include alloys of silicon bronze, aluminum bronze, or cupro-nickel. In one example, the filler wire 56 is 96% copper, 3% silicon, and 1% manganese. A filler wire 56 having a composition similar to the zinc coated steel can be also be used.

Copper has a melting temperature of approximately 1000° C. and steel melts at approximately 1500° C. Therefore, the copper based filler wire 56 melts before the steel sheets 72 and 74 would melt. Once the filler wire 56 advances into the weld pool 110, the filler wire 56 is held stationary for a predetermined amount of time to melt and incorporate into the hole or notch 102. The melting temperature of the steel sheets 72 and 74 is greater than the melting temperature of the copper based filler wire 56, and the steel sheets 72 and 74 remain undisturbed and will not melt.

When copper based materials are used, the heterogeneous joining method is commonly referred to as plasma brazing. When the filler wire 56 has a composition similar to the steel sheets 72 and 74, the homogeneous joining method is commonly referred to as plasma weldment. In this instance, both the filler wire 56 and the sheets 72 and 74 melt, creating a homogeneous joint.

Figure 9:
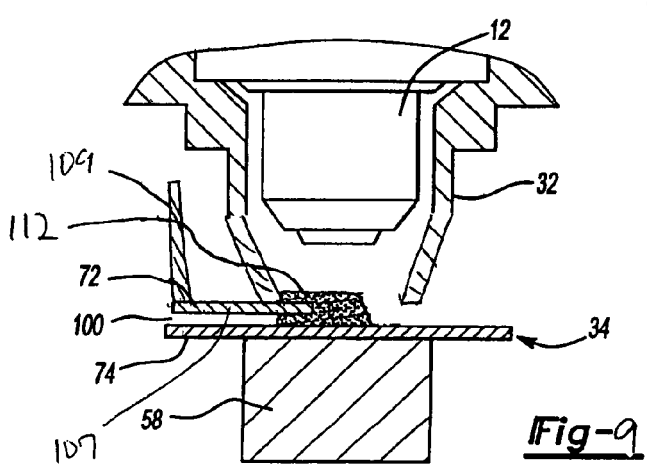
FIG. 9 illustrates a side view of the welding apparatus after removal of the filler wire.

As shown in FIGS. 9 and 10, the filler wire 56 melts and fills the hole or notch 102 to produce a spot braze or weld 112. The filler wire 56 also slightly flows into the small gap 100 between the sheets 72 and 74, further increasing the strength of the spot braze or weld 112. The workpiece 34 can then be unclamped and removed from the welding apparatus 10. The strength of the spot braze or weld 112 depends on the wetted area around the periphery of the hole or notch 102. Generally, the wetted area is only slightly less than the wetted area of a circular hole or notch. Therefore, the spot braze or weld 112 formed by the welding apparatus 10 is strong.

The sheets 72 and 74 can also be made of other materials, such as oxide coated aluminum alloy or oxide coated magnesium alloy. When the high temperature welding arc 106 contacts the upper surface 104 of the lower sheet 74, entrapped gases in the oxide film can freely vent. The filler wire 56 is typically an aluminum based alloy if the sheets 72 and 74 are aluminum and a magnesium based alloy if the sheets 72 an 74 are magnesium. If the sheets 72 and 74 and the filler wire 56 are both made of aluminum, the sheets 72 and 74 and the filler wire 56 have a similar melting temperature. In one example, the sheets 72 and 74 are 5754 aluminum alloy, which require a plasma gas (Argon) flow rate of 1.5 to 1.8 liters per minute, and the filler wire 56 is 5554 aluminum alloy having a diameter of 1.6 mm.

Figure 11:
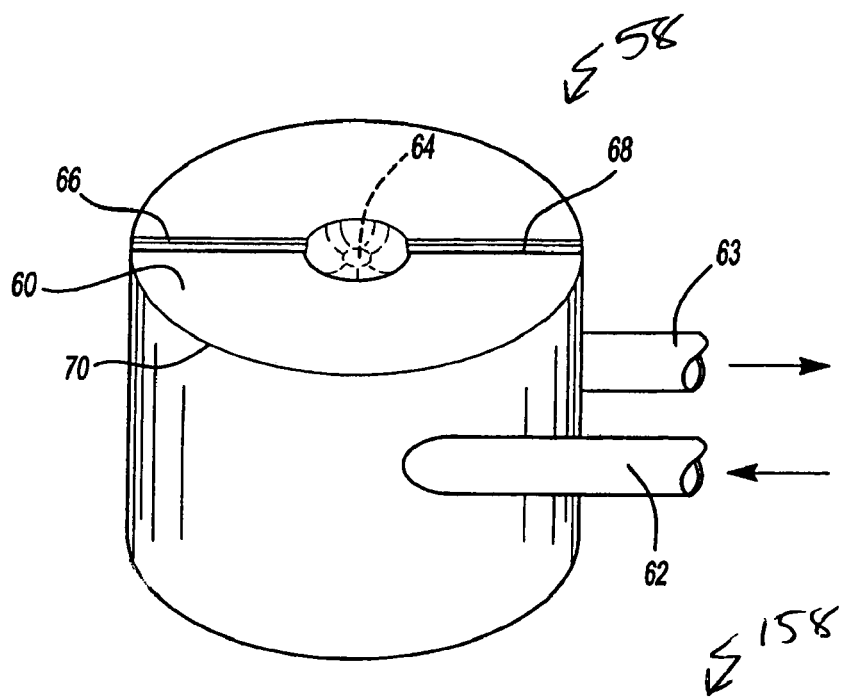
FIG. 11 illustrates a perspective view of a support member.

FIG. 11 illustrates the support surface 58. The support surface 58 includes an upper surface 60 against which the workpiece 34 rests and a hollow interior in which coolant circulates via an inlet 62 and an outlet 63. A recess 64 is provided in the upper surface 60, and two vent channels 66 and 68 extend in opposing directions from the recess 64 towards an edge 70. The edge 70 is slightly raised, preferably by about 0.05 mm.

If the sheets 72 and 74 and the filler wire 56 are both aluminum, the plasma arc welding torch 12 melts the aluminum lower sheet 74 below the hole or notch 102, producing a weld pool that is contained by the recess 64. Any air present in the recess 65 that expands due to heating vents through the vent channels 66 and 68. The vent channels 66 and 68 also provide an escape for surface coatings, such as wax lubricant, present on the underside of the lower sheet 74.

Figure 12:
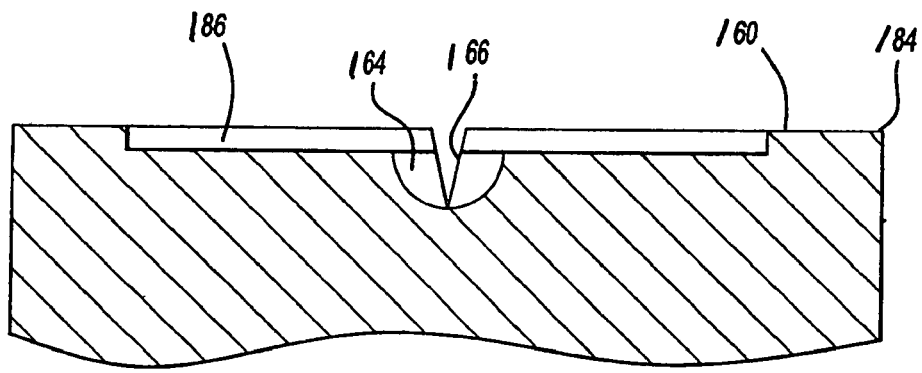
FIG. 12 illustrates a side view of an alternative support member.

FIG. 12 illustrates an alternative support surface 158 having a peripheral raised edge 184 which defines a substantially annular upper surface 60. A recess 164 is located in the middle of the upper surface 160. The peripheral raised edge 184 provides an air gap 186 between the support surface 158 and the workpiece 134 around the weld site, reducing the heat transfer from the workpiece 134 to the support surface 158 during welding.

Figure 13:
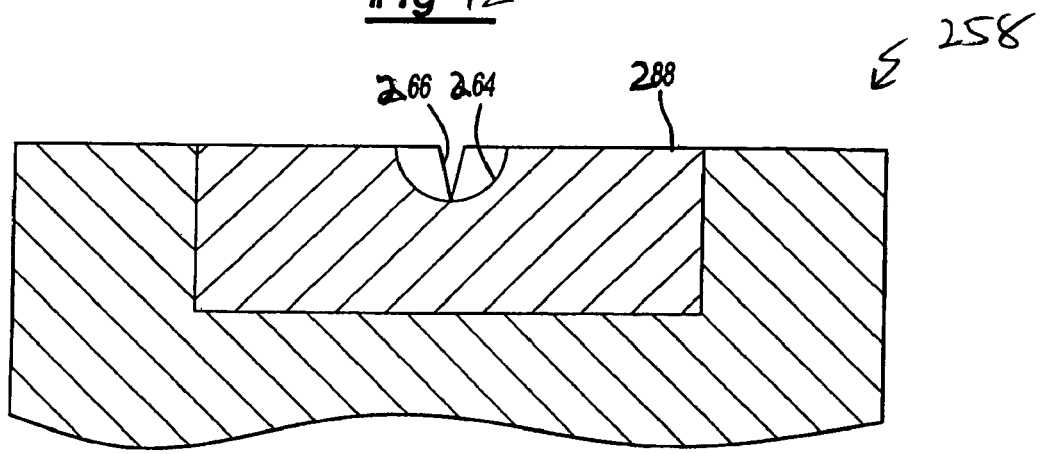
FIG. 13 illustrates a side view of another alternative support member.

FIG. 13 illustrates an alterative support surface 258 including an insert 288 that defines a recess 264 and two vent channels 266. The insert 288 is made of a material having a thermal conductivity that is lower than the thermal conductivity of the support surface 258. Therefore, the support surface 258 does not need to be cooled because a small amount of heat energy is transferred to the support surface 258 during welding. The insert 288 may be a high temperature non-metallic material which is not wetted by the molten metal of the weld pool or a ceramic material, such as reaction bonded silicon nitride. If the sheets 72 and 74 are made of aluminum having a thickness of 1 mm, and the support surface 258 is made of copper, a welding current of 150 amps for 3 seconds is typically needed. By utilizing an uncooled support surface 258 of copper having a ceramic insert 288, a welding current of 105 amps for 2 seconds is typically needed. That is, a lower welding current can be used because the support surface 258 is not conducting heat.

The insert 288 may also be manufactured from an electrically conductive material having a thermal conductivity lower than the thermal conductivity of the main body of the support surface 258. The insert 288 ensures that the support surface 258 is electrically conductive and that the electrical circuit formed between the workpiece 34 and the plasma arc welding torch 12 is not broken during welding.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of spot welding an upper member and a lower member, the method comprising the steps of:
   forming a notch at an edge of the upper member;
   positioning the upper member above the lower member;
   releasing vapors from a portion of the lower member that is located within the notch; and
   introducing a filler into the notch to secure the upper member to the lower member.

2. The method as recited in claim 1 wherein the step of forming the notch includes one of punching and shearing.

3. The method as recited in claim 1 wherein the step of releasing the vapors includes utilizing a welding torch.

4. The method as recited in claim 1 wherein the step of introducing the filler includes advancing the filler into the notch to contact the lower member, melting the filler in the notch to form a weld pool, and withdrawing the filler from the notch.

5. The method as recited in claim 1 further including the step of clamping the upper member and the lower member together prior to the step of releasing the vapors.

6. The method as recited in claim 1 wherein the upper member and the lower member are steel having a coating, and the filler is a copper based wire.

7. The method as recited in claim 1 wherein the upper member and the lower member are aluminum alloy having an oxide coating, and the filler is an aluminum based wire.

8. The method as recited in claim 1 wherein the upper member and the lower member are magnesium alloy, the coating is oxide, and the filler is a magnesium based wire.

9. The method as recited in claim 1 further including the step of supporting the upper member and the lower member from beneath.

10. The method as recited in claim 1 wherein a gap exists between the upper member and the lower member, and the filler flows in the gap to secure the upper member to the lower member.

11. The method as recited in claim 1 wherein the filler has a filler melting temperature and the upper member and the lower member have a member melting temperature greater than or equal to the filler melting temperature.

12. The method as recited in claim 1 wherein the notch is substantially semi-circular in shape.

13. The method as recited in claim 1 further including the step of securing the upper member and the lower member together with the filler.

14. The method as recited in claim 1 wherein the upper member and the lower members include a coating, and the step of releasing vapors includes releasing coating vapors from the lower member.

15. A method of spot welding an upper member and a lower member, the method comprising the steps of:
    forming a substantially semi-circular notch at an edge of the upper member;
    positioning the upper member above the lower member;
    releasing vapors from a portion of the lower member that is located within the substantially semi-circular notch with a welding torch;
    advancing a filler into the substantially semi-circular notch;
    melting the filler in the substantially semi-circular notch;
    withdrawing the filler from the substantially semi-circular notch; and
    securing the upper member and the lower member together.

16. The method as recited in claim 15 wherein the step of securing the upper member and the lower member further includes securing the upper member and lower member together with the filler.

17. The method as recited in claim 15 wherein the upper member and the lower members include a coating, and the step of releasing vapors includes releasing coating vapors from the lower member.

18. A welding apparatus comprising:
    a lower member and an upper member, the upper member including a notch at an edge, and the upper member is positioned over the lower member;
    a plasma arc torch to release vapors from a portion of the lower member that is located within the notch; and
    a filler to secure the lower member to the upper member to produce a spot weld.

19. The apparatus as recited in claim 18 further including a supporting member to support the upper member and the lower member from beneath.

20. The apparatus as recited in claim 18 wherein the upper member and the lower member are steel having a zinc coating, and the filler is a copper based wire.

21. The apparatus as recited in claim 18 wherein the upper member and the lower member are aluminum alloy having an oxide coating, and the filler is an aluminum based wire.

22. The apparatus as recited in claim 18 wherein the upper member and the lower member are magnesium ahoy, the coating is oxide, and the filler is a magnesium based wire.

23. The apparatus as recited in claim 18 wherein the filler has a filler melting temperature and the upper member and the lower member have a member melting temperature greater than or equal to the filler melting temperature.

24. The apparatus as recited in claim 18 wherein the upper member includes a flange portion and an angled portion angled with respect to the flange portion, and the notch is located in the flange portion.

25. The apparatus as recited in claim 18 further including a clamp cup, and the clamp cup includes a top surface attached to the plasma arc torch, a cylindrical side portion, a bottom surface that contacts the upper member, and an angled portion that extends between the cylindrical side portion and the bottom surface.

26. The apparatus as recited in claim 14 wherein the notch is substantially semi-circular in shape.

27. The apparatus as recited in claim 18 wherein the upper member and the lower members include a coating, and the plasma arc torch releases coating vapors from the lower member.

* * * * *

UNITED STATES PATENT AND TRADEMARK OFFICE
CERTIFICATE OF CORRECTION

PATENT NO. : 7,091,442 B2  Page 1 of 1
APPLICATION NO. : 10/909163
DATED : August 15, 2006
INVENTOR(S) : Russell Vernon Hughes It is certified that error appears in the above-identified patent and that said Letters Patent is hereby corrected as shown below:

Claim 18, Column 8, line 5: "are" should be --arc--

Claim 22, Column 8, line 22: "ahoy" should be --alloy--

Signed and Sealed this

Fourteenth Day of November, 2006

JON W. DUDAS
*Director of the United States Patent and Trademark Office*